US008729804B2

(12) United States Patent
Tien et al.

(10) Patent No.: US 8,729,804 B2
(45) Date of Patent: May 20, 2014

(54) SWITCHING MODULE OF ADJUSTING A VISUAL ANGLE AND RELATED BACKLIGHT SYSTEM

(75) Inventors: Chung-Hao Tien, New Taipei (TW); Yu-Lin Tsai, New Taipei (TW); Szu-Fen Chen, New Taipei (TW); Hui-Chen Lin, New Taipei (TW); Meng-Chao Kao, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 54 days.

(21) Appl. No.: 13/589,198

(22) Filed: Aug. 20, 2012

(65) Prior Publication Data

US 2013/0320878 A1 Dec. 5, 2013

(30) Foreign Application Priority Data

Jun. 1, 2012 (TW) ............................. 101119772 A

(51) Int. Cl.
*H01J 7/24* (2006.01)
*H05B 31/26* (2006.01)

(52) U.S. Cl.
USPC ............... 315/111.01; 315/111.11; 315/169.3

(58) Field of Classification Search
None
See application file for complete search history.

(56) References Cited

U.S. PATENT DOCUMENTS

| 5,570,210 | A | 10/1996 | Yoshida |
| 7,350,955 | B2 * | 4/2008 | Chang et al. ................. 362/612 |
| 7,453,429 | B2 | 11/2008 | Chang |
| 7,468,770 | B2 | 12/2008 | Okumura |
| 2008/0192173 | A1 * | 8/2008 | Itoh et al. ....................... 349/61 |
| 2010/0220260 | A1 * | 9/2010 | Sugita et al. .................. 349/62 |
| 2011/0116010 | A1 * | 5/2011 | Nagata et al. ................. 349/62 |

* cited by examiner

*Primary Examiner* — Anh Tran
(74) *Attorney, Agent, or Firm* — Winston Hsu; Scott Margo

(57) ABSTRACT

A switching module capable of adjusting a visual angle is disclosed. The switching module includes an edge-type optical substrate, a light source disposed by a side of the edge-type optical substrate, and an optical modulating component disposed between the light source and the edge-type optical substrate. The edge-type optical substrate has an emitting surface. The light source includes a plurality of light units. Each light unit can emit a beam to the edge-type optical substrate according to a predetermined angle. The optical modulating component can modulate divergence of the beam emitted from the light unit, so that the beam can be guided out of the edge-type optical substrate via the emitting surface according to the predetermined angle.

23 Claims, 8 Drawing Sheets

SWITCHING MODULE OF ADJUSTING A VISUAL ANGLE AND RELATED BACKLIGHT SYSTEM

BACKGROUND OF THE INVENTION

1. Field of the Invention

The present invention relates to a switching module and a related backlight system, and more particularly, to a switching module capable of adjusting a visual angle and a related backlight system.

2. Description of the Prior Art

A conventional backlight module includes a light guide substrate and a plurality of light units. The light units can be disposed on a side of the light guide substrate or on a bottom of the light guide substrate according to types of the backlight module, such as the edge-type backlight module or the direct-type backlight module. In the edge-type backlight module, a plurality of reflection units is disposed on a bottom of the light guide substrate, a beam emitted from the light unit into the side of the light guide substrate can be guide out of the light guide substrate via an emitting surface of the light guide substrate, so as to provide uniform light source. Generally, the reflection units are formed by an ink printing method or a micro structure technology to generate reflecting effect. Because the light guide substrate of the conventional backlight module can fully receive the beam emitted from the light units, and the reflection units disposed on the bottom of the light guide substrate can uniformly reflect the beam out of the light guide substrate through the emitting surface, so as to provide the uniform light source. The conventional backlight module can not adjust its output parameters except intensity variation, which decreases usability of the related backlight product. Therefore, design of a backlight module capable of adjusting divergence, emitting angle and local dimming of the light source is an important issue in the display industry.

SUMMARY OF THE INVENTION

The present invention provides a switching module capable of adjusting a visual angle and a related backlight system for solving above drawbacks.

According to one aspect of the invention, a switching module capable of adjusting a visual angle is disclosed. The switching module includes an edge-type optical substrate, a light source and an optical modulating component. The edge-type optical substrate includes an emitting surface. The light source is disposed by a side of the edge-type optical substrate. The light source includes a plurality of light units, and each light unit emits a beam to the edge-type optical substrate according to a predetermined angle. The optical modulating component is disposed between the light source and the edge-type optical substrate. The optical modulating component modulates divergence of the beam emitted from each light unit, so that the beam is guided out of the edge-type optical substrate via the emitting surface according to the predetermined angle.

According to another aspect of the invention, a backlight system includes a plurality of switching module for adjusting visual angles. Each switching module includes an edge-type optical substrate, a light source and an optical modulating component. The edge-type optical substrate includes an emitting surface. The light source is disposed by a side of the edge-type optical substrate. The light source includes a plurality of light units, and each light unit emits a beam to the edge-type optical substrate according to a predetermined angle. The optical modulating component is disposed between the light source and the edge-type optical substrate. The optical modulating component modulates divergence of the beam emitted from each light unit, so that the beam is guided out of the edge-type optical substrate via the emitting surface according to the predetermined angle.

The switching module and the related backlight system of the present invention can switch the visual angle to economize the power consumption, and can further switch the visual angle to selectively perform the 2D image or the 3D image. The present invention has advantages of easy manufacture, low cost, and high optical utilization rate, so as to increase product applicability by simple system and related adjustable parameters.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
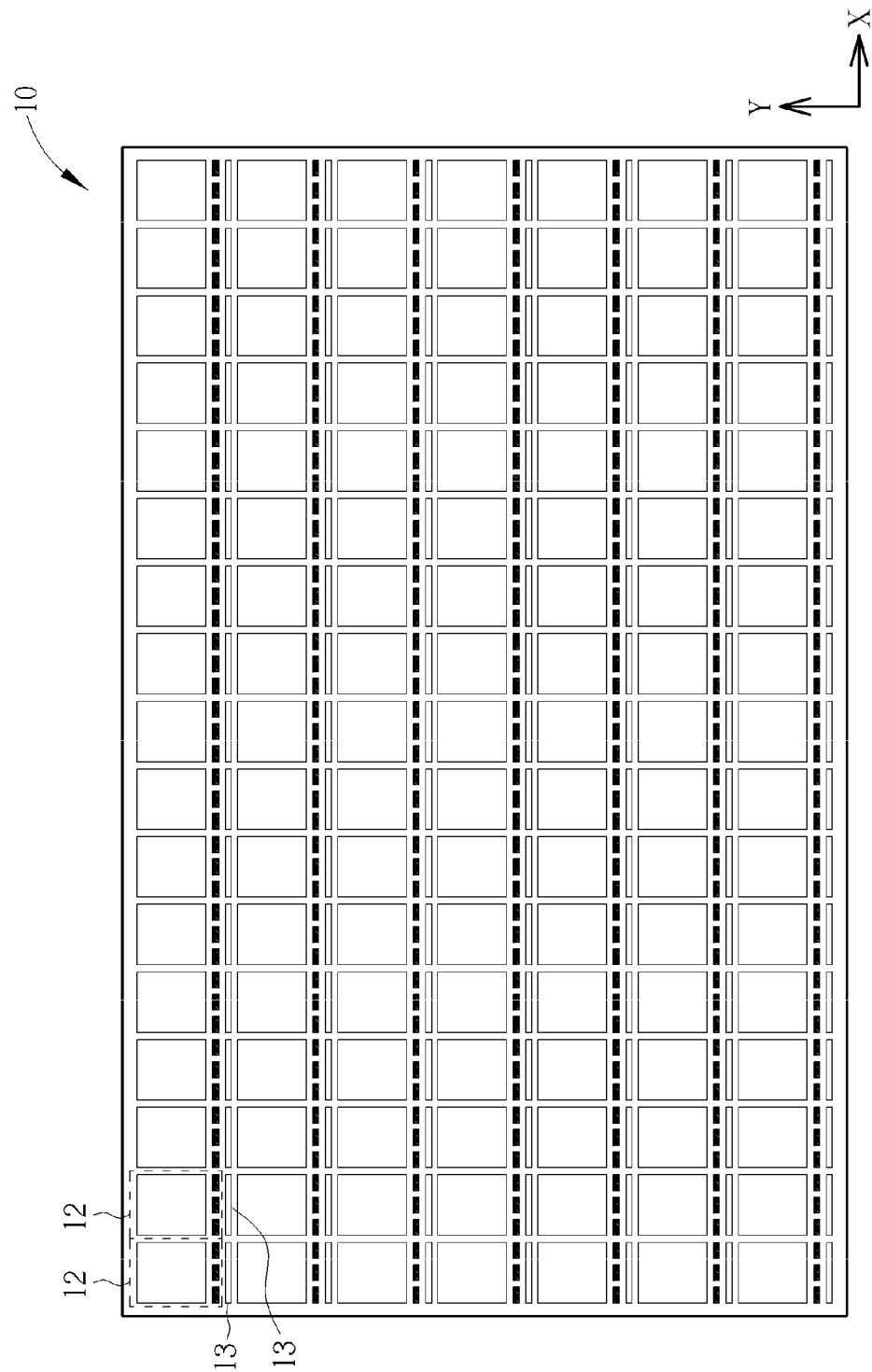
FIG. 1 is a diagram of a backlight system according to an embodiment of the present invention.

Please refer to FIG. 1. FIG. 1 is a diagram of a backlight system 10 according to an embodiment of the present invention. The backlight system 10 can include a plurality of switching modules 12. With different arrangements, such as a quadrangle arrangement, a rhombus arrangement or the other geometric arrangements, the plurality of switching modules 12 can be arranged as an array to provide uniform light for the backlight system 10. Light intensity and illumination of each switching module 12 can be adjusted independently, so that the backlight system 10 can be applied to a local dimming technology for adjusting the light intensity and the illumination of different switching modules 12, and the backlight system 10 has advantages of low power consumption, high contrast value and less ghost image. The backlight system 10 can further include a plurality of reflection units 13. Each reflection unit 13 can be disposed between the adjacent switching modules 12. The reflection unit 13 can reflect a beam leaked from each switching module 12 back into the corresponding switching module 12, so as to increase display quality of the backlight system 10.

Figure 2:
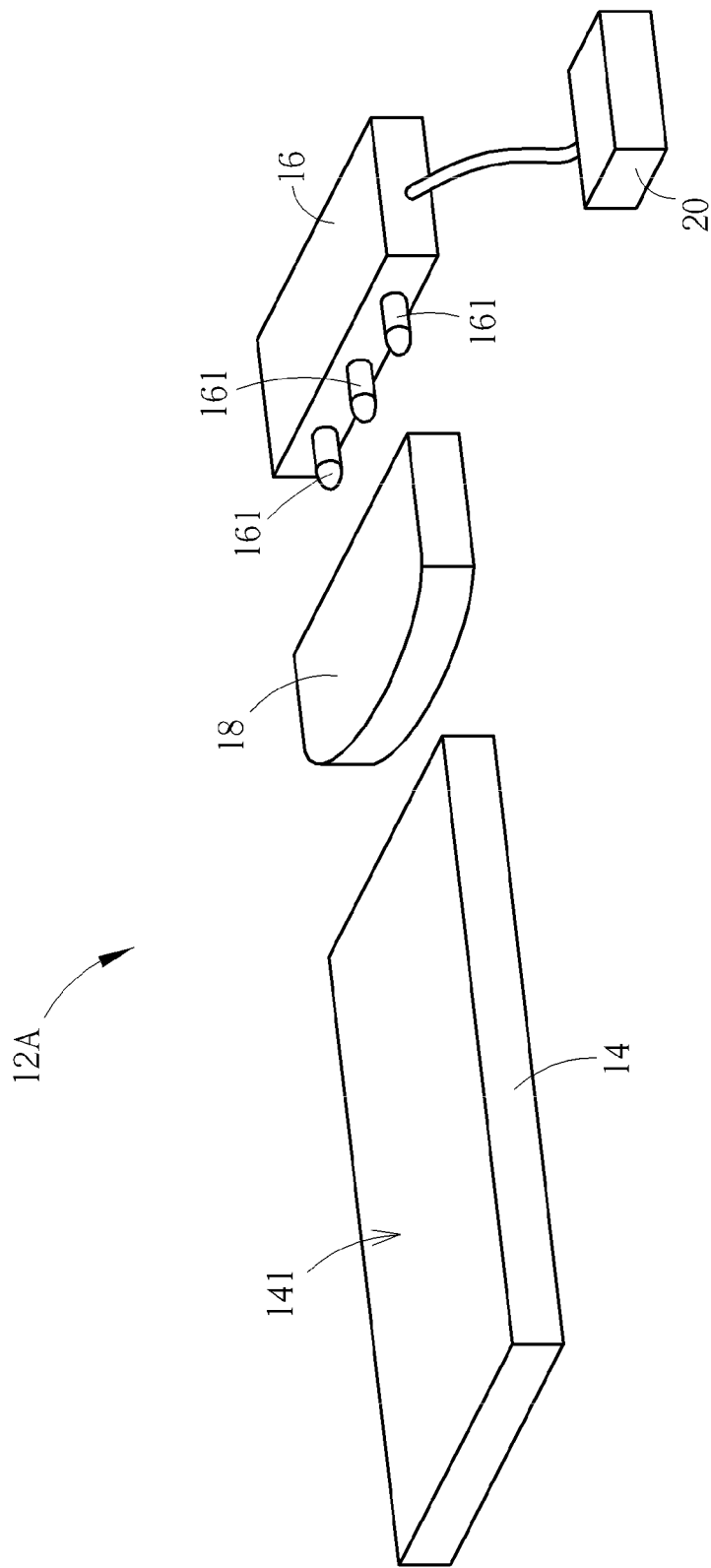
FIG. 2 is a diagram of a switching module according to a first embodiment of the present invention.

Detailed structural description of the switching module 12 is illustrated as follow. Please refer to FIG. 2. FIG. 2 is a diagram of the switching module 12A according to a first embodiment of the present invention. The switching module 12A includes an edge-type optical substrate 14, a light source 16 and an optical modulating component 18. The light source 16 includes a plurality of light units 161, and the light sources 16 are disposed on a side of the edge-type optical substrate 14.

The light units 161 can be disposed in a symmetric arrangement or in an asymmetric arrangement based on a middle point of the side of the edge-type optical substrate 14. In the first embodiment, the light units in the symmetric arrangement are based on the middle point of the side of the edge-type optical substrate 14. Each light unit 161 can emit a beam into the edge-type optical substrate 14 according to a predetermined angle, and then the beam can be transmitted to a far end of the edge-type optical substrate 14 by total internal reflection. The optical modulating component 18 can be disposed between the light source 16 and the edge-type optical substrate 14. Because the beam emitted from the light unit 161 has large divergent angle, the optical modulating component 18 can modulate divergence of the beam emitted from each light unit 161, converge the emitting angle of the beam to narrow its divergent angle, so that the beam can be transmitted into the edge-type optical substrate 14 according to the predetermined angle, and be guided out of the edge-type optical substrate 14 via an emitting surface 141 of the edge-type optical substrate 14 according to the same predetermined angle.

Figure 3:
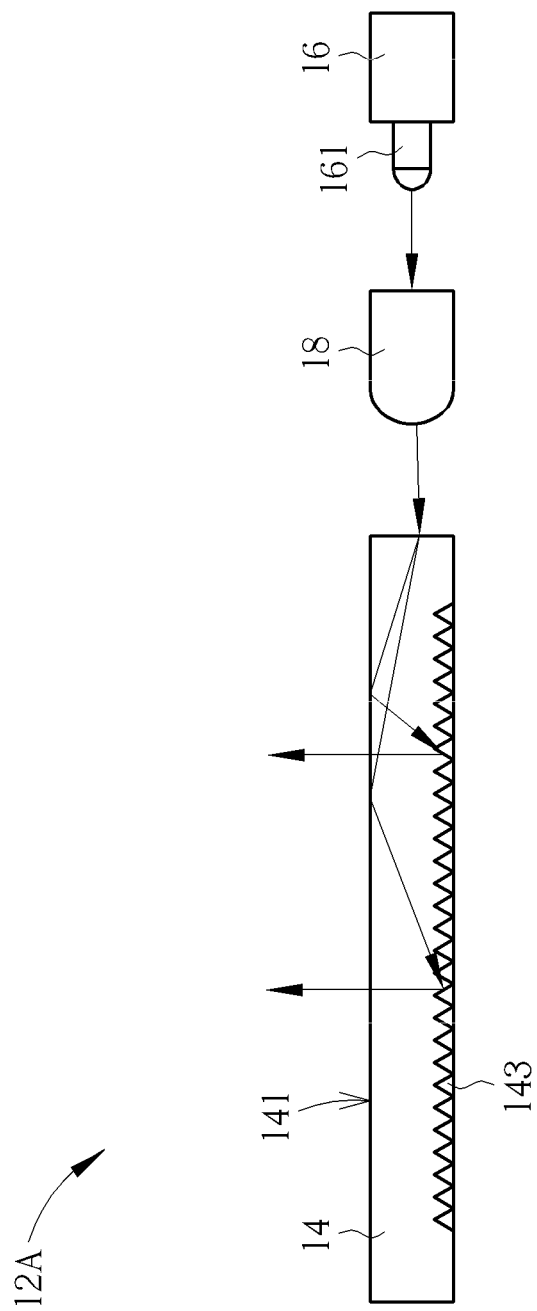
FIG. 3 is a sectional view of the switching module according to the first embodiment of the present invention.

It should be mentioned that the edge-type optical substrate 14 can guide the beam out of the emitting surface 141 according to the predetermined angle, so the edge-type optical substrate 14 can include a V-shaped reflecting structure 143 disposed on the bottom of the edge-type optical substrate 14. Please refer to FIG. 3. FIG. 3 is a sectional view of the switching module 12A according to the first embodiment of the present invention. Reflection units formed by an ink printing method can uniformly reflect the beam out of the light guide plate in divergence, and the switching module 12 of the present invention can utilize the V-shaped reflecting structure 143 to reflect the beam straightly, so that the beam emitted from each light unit 161 can be guided out of the edge-type optical substrate 14 according to the initial predetermined angle. Structure of the optical modulating component 18 can correspond to a predetermined curve function. The curve function is designed according to an amount, an arrangement and an incident angle of the light unit 161 of the light source 16, thus, the optical modulating component 18 can be utilized to converge the emitting angle of each light unit 161. The switching module 12A can further include a processor 20 electrically connected to the light source 16. The backlight system 10 can utilize each processor 20 to control the intensity and the illumination of the corresponding switching module 12, which performs the local dimming technology.

A lateral shape of the edge-type optical substrate 14 can be a rectangle shape, an elliptical shape, a polygon shape or a pillar geometric shape. The reflecting structure disposed on the bottom of the edge-type optical substrate 14 not only can be the above-mentioned V-shaped reflecting structure 143, but also can be designed as a hemisphere reflecting structure, a cone reflecting structure, an inclined surface structure or any optical microstructures that can stably reflect the beam. Types of the reflecting structure of the present invention are not limited to the above-mentioned embodiment, the structural component having the same effect belongs to the design scope of the switching module of the present invention, and a detailed description is omitted herein for simplicity.

Figure 4:
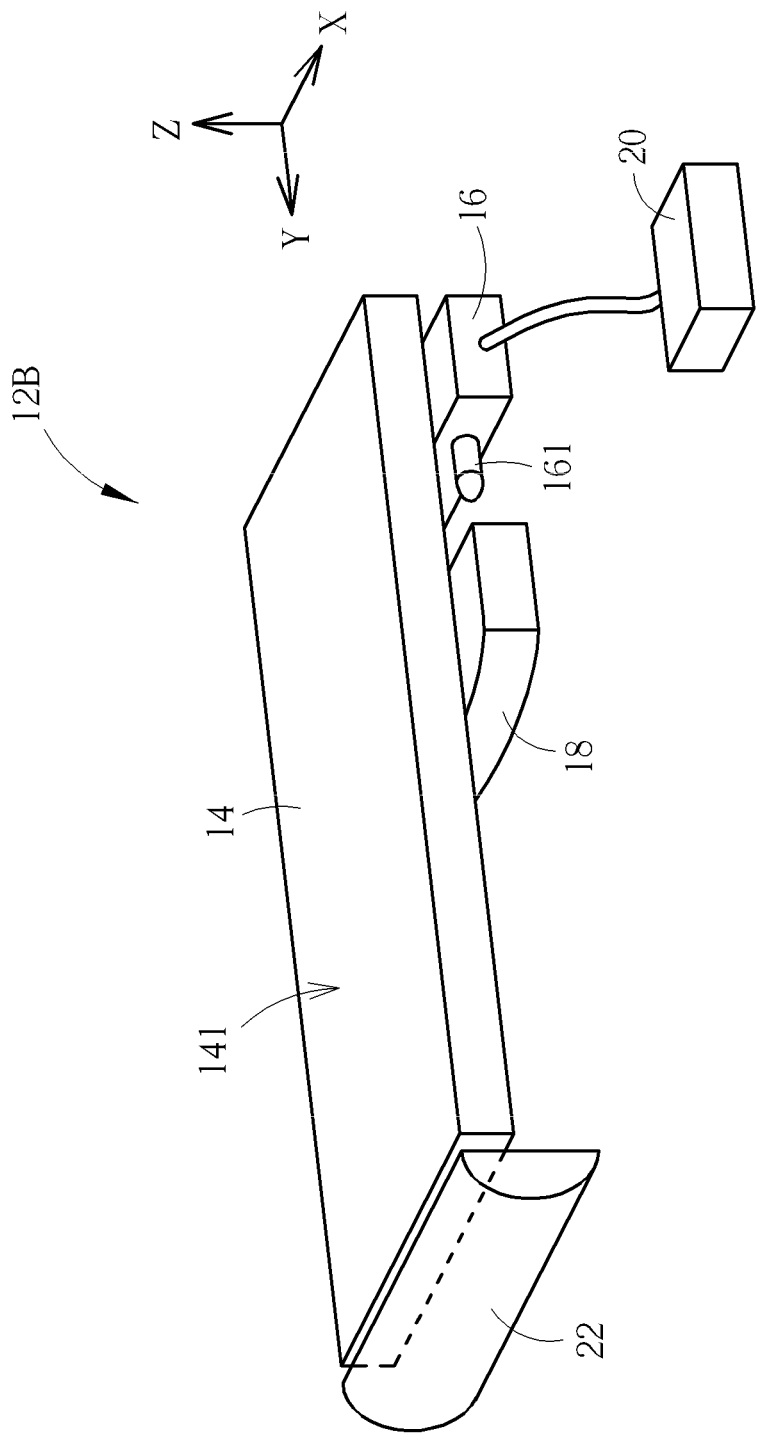
FIG. 4 is a diagram of the switching module according to a second embodiment of the present invention.

Please refer to FIG. 4. FIG. 4 is a diagram of the switching module 12B according to a second embodiment of the present invention. Elements having the same numeral as ones of the first embodiment have the same structure and function. Difference between the second embodiment and the first embodiment is that the switching module 12B can include the edge-type optical substrate 14, the light source 16, the optical modulating component 18, the processor 20 and an optical coupling component 22. The light source 16 of the second embodiment can be disposed on a bottom outer of the side of the edge-type optical substrate 14. The plurality of light units 161 can be arranged along X axis. The optical coupling component 22 can be disposed on the other side of the edge-type optical substrate 14 opposite to the light source 16. Each light unit 161 can emit the beam along Y axis, and the beam can be transmitted toward the optical coupling component 22. The optical modulating component 18 can be disposed on the bottom outer of the edge-type optical substrate 14, and be located between the light source 16 and the optical coupling component 22. After the beam is transmitted into the edge-type optical substrate 14 via the optical modulating component 18 and the optical coupling component 22 in sequence, the beam is guided out of the emitting surface 141 along Z axis. In the second embodiment, the optical modulating component 18 can be a condenser lens.

Dimensions of the optical coupling component 22 of the switching module 12B can fully cover a total superficial measure of the edge-type optical substrate 14 and the light source 16. The beam emitted from the light source 16 can be condensed by the optical modulating component 18, and then can be transmitted to the optical coupling component 22. The optical coupling component 22 can guide the beam into the edge-type optical substrate 14 via the other side of the edge-type optical substrate 14 in a reverse turning method, and then the reflecting structure 143 can guide the beam out of the edge-type optical substrate 14 via the emitting surface 141. Therefore, the second embodiment utilizes the optical coupling component 22 to extend an optical path of the switching module 12B, so as to increase backlight uniformity of the backlight system 10. For example, the optical path of the second embodiment is two times the optical path of the first embodiment. In addition, the light source 16 and the optical modulating component 18 of the second embodiment can be put on the bottom of the edge-type optical substrate 14. A gap between the adjacent switching modules 12B can be decreased, and the backlight system 10 can provide artistic image.

Structure of the optical coupling component 22 can be designed according to different backlight demands, such as a total reflection optical coupling component or a mirror reflection optical coupling component. The total reflection optical coupling component can be a rhombus mirror. Refractive index is varied according to difference of the manufacturing material, and the beam can be transmitted from the bottom outer of the edge-type optical substrate 14 to an upper layer of the edge-type optical substrate 14 by the total internal reflection. The mirror reflection optical coupling component can be a sphere mirror, a plane mirror, or any optical components can reflect the beam from the bottom outer of the edge-type optical substrate 14 to the upper layer of the edge-type optical substrate 14. The reflection mirror can be made of high reflective index material, such as aluminum material, silver material or mercury material. Types of the optical coupling component 22 of the present invention are not limited to the above-mentioned embodiments, and depend on design demand.

Figure 5:
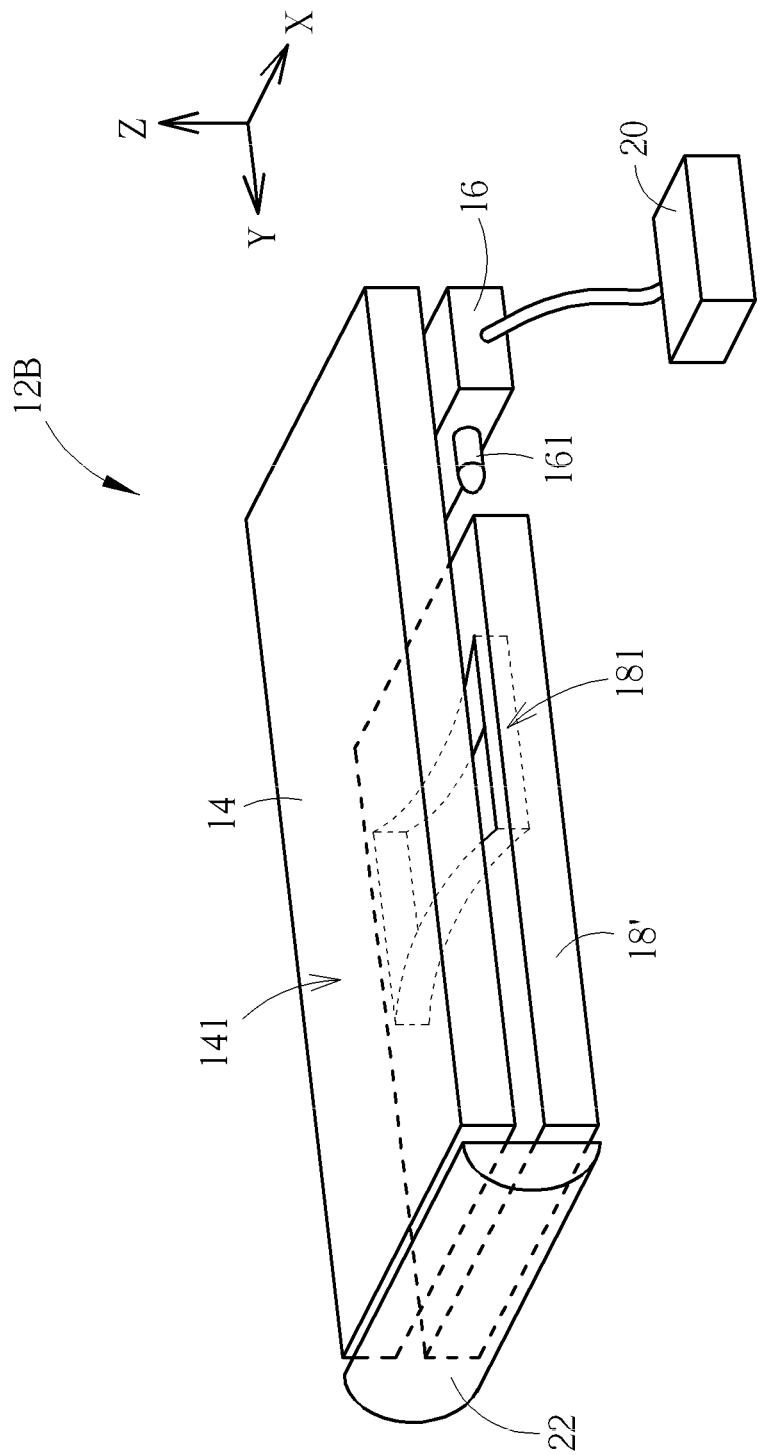
FIG. 5 is a diagram of the switching module according to a third embodiment of the present invention.

Please refer to FIG. 5. FIG. 5 is a diagram of the switching module 12C according to a third embodiment of the present invention. In the third embodiment, elements having the same numerals as ones of the above-mentioned embodiments have the same structure and function, and a detailed description is omitted herein for simplicity. Difference between the third embodiment and the above-mentioned embodiments is that the optical modulating component 18' of the third embodiment can be a light guide plate with an embedded condenser structure 181. Air or other transparent material can be filled into the embedded condenser structure 181 of the optical modulating component 18'. Due to refractive index difference between the air and the light guide plate, the embedded condenser structure 181 can be a concave lens, so that the optical modulating component 18' can be the condenser light guide plate for enhancing stability of beam transmission. In the third embodiment, the optical modulating component 18' can be tightly disposed on the bottom of the edge-type optical substrate 14, preferably. Dimensions of the optical coupling component 22 can be substantially equal to a total lateral superficial measure of the edge-type optical substrate 14 and the optical modulating component 18'. The optical path of the third embodiment is substantially equal to ones of the second embodiment, and a detailed description is omitted herein for simplicity. The optical modulating component 18' is slightly spaced from the edge-type optical substrate 14 for recognizing the embedded condenser structure 181, as shown in FIG. 5, and actual application is not limited to the above-mentioned embodiment.

Figure 6:
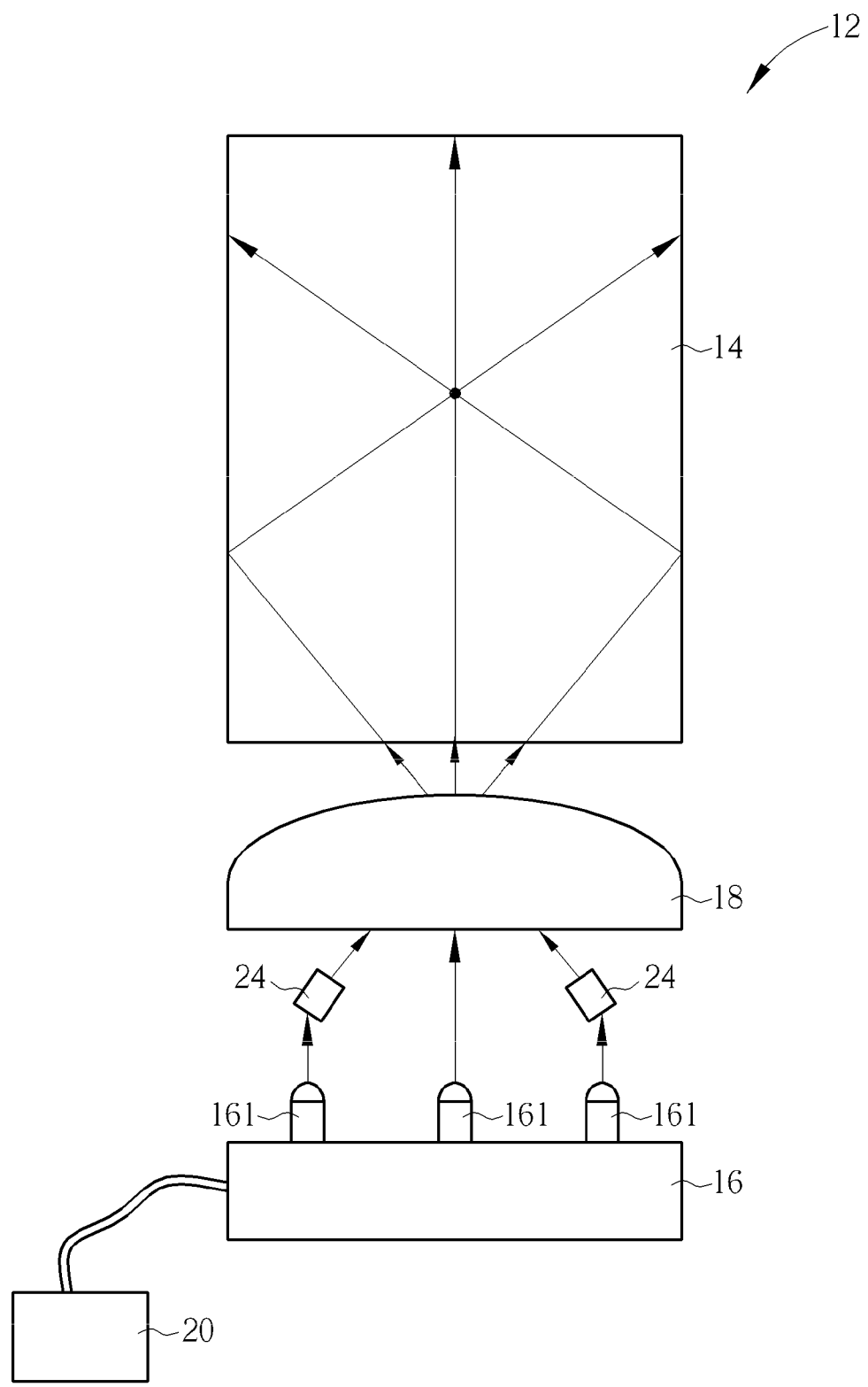
FIG. 6 and FIG. 7 respectively are structural diagrams of a light source according to the different embodiments of the present invention.
Figure 7:
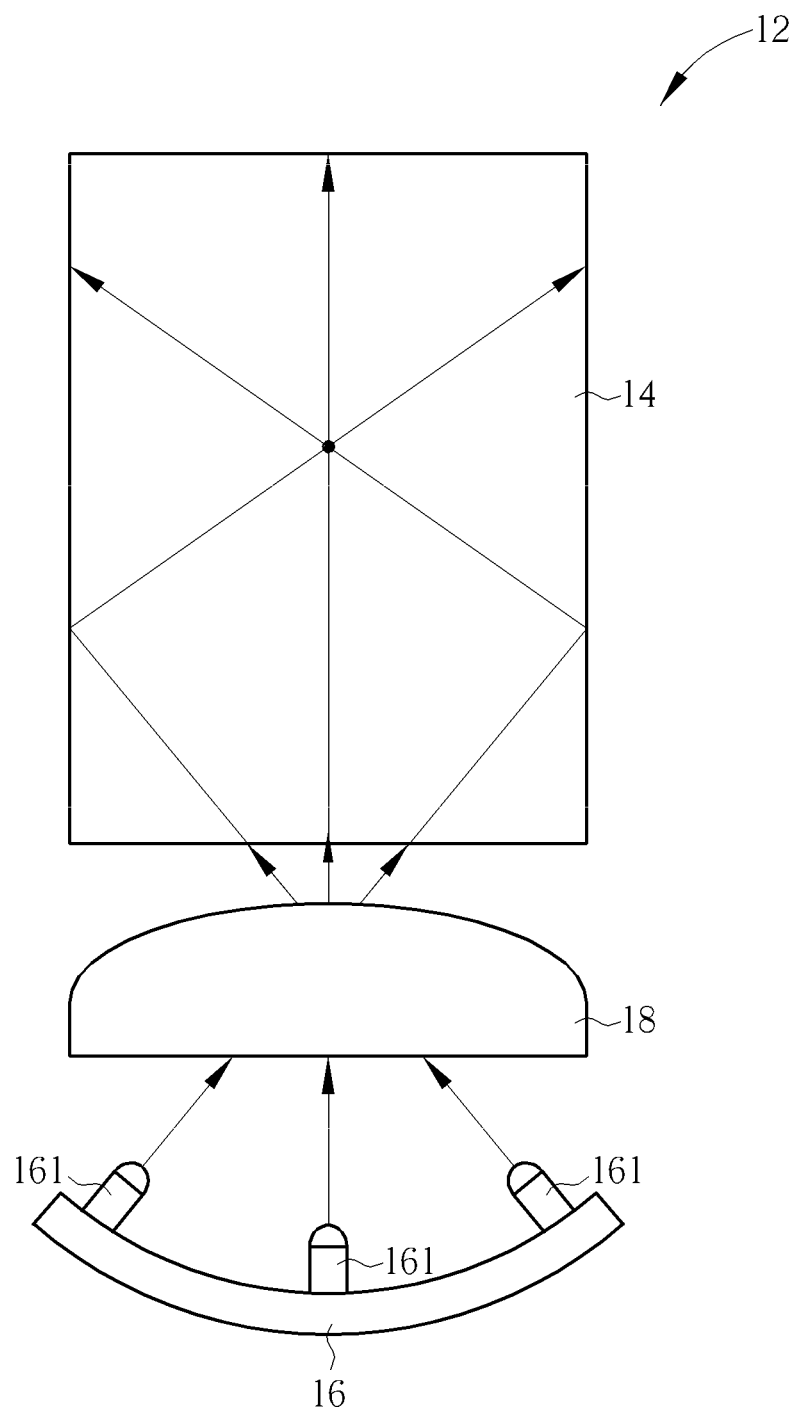

Please refer to FIG. 6 and FIG. 7. FIG. 6 and FIG. 7 respectively are structural diagrams of the light source 16 according to the different embodiments of the present invention. As shown in FIG. 6, the switching module 12 can further include a plurality of optical controlling components 24. The optical controlling components 24 are respectively disposed on a front of the corresponding light unit 161 of the light source 16. Generally, the light source 16 is composed of straight light bars, which means each light unit 161 emits the beam straightly. Thus, each optical controlling component 24 can adjust the beam emitted from the corresponding light unit 161 toward the predetermined angle, so that the switching module 12 of the present invention can have angle control of local dimming function. Besides, as shown in FIG. 7, the optical controlling component may not be disposed in this embodiment. The light units 161 can be arranged as an arc to form the light source 16. The arc function can be designed according to the predetermined angle. The edge-type optical substrate 14 of this embodiment can have multiple visual angles function, and the switching module 12 can modulate the visual angle to economize power consumption, and to switch into a 2D mode or a 3D mode according to user's demand.

For example, as shown in FIG. 6, the central light unit 161 of the light source 16 emits the beam straightly, there is no optical controlling component 24 disposed on the central light unit 161. The side light units 161 (the left side and the right side) of the light source 16 can utilize the optical controlling component 24 to guide transmission direction of the beam. The beam can be transmitted from an outer left side (or an outer right side) of the edge-type optical substrate 14 toward an inner right side (or an inner left side) of edge-type optical substrate 14. As shown in FIG. 7, the central light unit 161, the right light unit 161 and the left light unit 161 of the light source 16 can respectively emit the beam into the edge-type optical substrate 14 along different directions, the beam are transmitted via the optical modulating component 18 according to an initial arrangement. Generally, the light unit 161 can be a light emitting diode (LED). The beam emitted from the LED has large divergent angle, the optical modulating component 18 is necessary to converge the beam emitted from the light unit 161, so that the beam can be straightly emitted into the edge-type optical substrate 14. The switching module 12 of the present invention can emit the beam into the edge-type optical substrate 14, and an amount of the beam corresponds to an amount of the light units 161. Then, the processor 20 can selectively actuate the whole light units 161 simultaneously, or merely actuate a part of the light units 161 according to user's demand.

Figure 8:
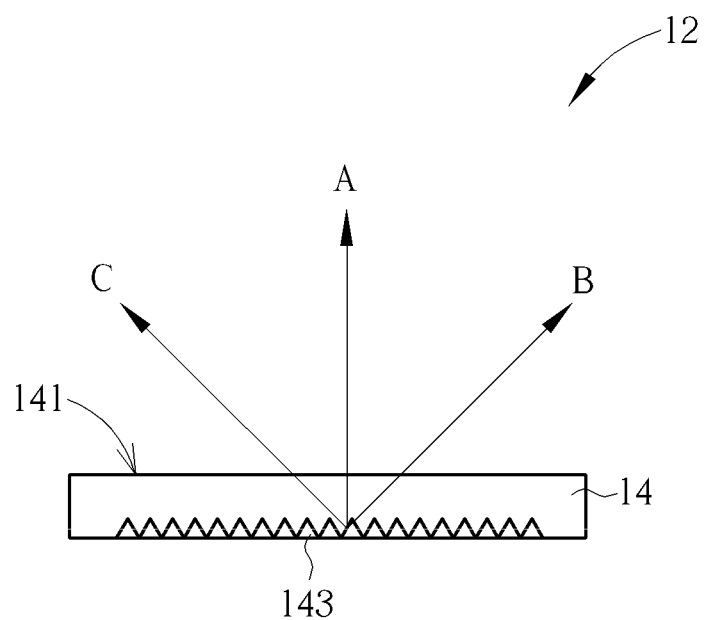
FIG. 8 is a sectional view of the switching module shown in FIG. 6 and FIG. 7.

Please refer to FIG. 8. FIG. 8 is a sectional view of the switching module 12 shown in FIG. 6 and FIG. 7. The light source 16 can include three light units 161 or any other amounts. As shown in FIG. 6 to FIG. 8, the light source 16 emits three beams into the edge-type optical substrate 14 via the optical modulating component 18, and the beams can be guided out of the emitting surface 141 according to each predetermined angle. For example, the beam A can be guide out of the emitting surface 141 vertically. Angles between the beams B&C and the beam A are substantially equal to 45 degrees when the beams B&C are guided out of the emitting surface 141. When the user faces the beam A, the switching module 12 can open the whole light units 161 of the light source 16, so the backlight system 10 shows the great intensity. When the user faces a side of the edge-type optical substrate 14, such as facing the beam C, the switching module 12 can adjust the light unit 161 to decrease an intensity of the beam B. Meanwhile, the switching module 12 emits the beams A, B and C along three directions continuously, and backlight intensity of the edge-type optical substrate 14 can be decreased for economizing the power consumption of the switching module 12. Further, the light source 16 can emit two beams with different polarizations or chromatic aberration along different emitting directions (such as along directions of the beams B and C), eyes of the user can respectively receive the two separate beams to generate parallax, and the 3D image can be formed by the switching module 12.

In conclusion, the backlight system of the present invention can be composed of the plurality of switching modules. Each switching module is controlled by the independent processor. The light source and the optical modulating component of the switching module can be disposed on the side of the edge-type optical substrate 14 or on the bottom of the edge-type optical substrate 14 according to design demands, such as thickness decrease of the backlight system or optical path extension for preferred optical uniformity. The light source of the present invention can utilize the optical controlling component to adjust the emitting angle of the light unit, or the present invention can further arrange the light units by the predetermined arc function to form the light source, so as to provide the angle control of the local dimming function. In addition, the optical modulating component is designed according to the arrangement of the light unit and structural parameters of the edge-type optical substrate for effectively converging the divergent angle of each light unit.

Comparing to the prior art, the switching module and the related backlight system of the present invention can switch the visual angle to economize the power consumption, and can further switch the visual angle to selectively perform the 2D image or the 3D image. The present invention has advantages of easy manufacture, low cost, and high optical utilization rate, so as to increase product applicability by simple system and related adjustable parameters.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A switching module capable of adjusting a visual angle, the switching module comprising:
an edge-type optical substrate having an emitting surface;
a light source disposed by a side of the edge-type optical substrate and on a bottom of the side of the edge-type optical substrate, the light source comprising a plurality of light units, each light unit emitting a beam to the edge-type optical substrate according to a predetermined angle;

an optical modulating component disposed between the light source and the edge-type optical substrate, the optical modulating component modulating divergence of the beam emitted from each light unit, so that the beam is guided out of the edge-type optical substrate via the emitting surface according to the predetermined angle; and an optical coupling component disposed on the other side of the edge-type optical substrate opposite to the light source, the beam emitted from the light source being guided into the edge-type optical substrate via the optical modulating component and the optical coupling component, the optical coupling component guiding the beam emitted from the light source into the edge-type optical substrate via the other side of the edge-type optical substrate in a reverse turning method.

2. The switching module of claim 1, wherein the light units of the light source are arranged as an arc, so that each light unit emits the beam according to the predetermined angle.

3. The switching module of claim 1, further comprising:
at least one optical controlling component disposed on the corresponding light unit for adjusting the beam emitted from the light unit toward the predetermined angle.

4. The switching module of claim 1, wherein the optical modulating component is a condenser lens, or a light guide plate with an embedded condenser structure.

5. The switching module of claim 1, wherein structure of the optical modulating component corresponds to a predetermined curve function for converging an emitting angle of the beam emitted from each light unit.

6. The switching module of claim 5, wherein the curve function of the optical modulating component corresponds to an incident angle of each beam emitted from the light units.

7. The switching module of claim 1, further comprising:
a processor electrically connected to the light source, the processor actuating the light units respectively or simultaneously, so as to switch angle control of local dimming of the edge-type optical substrate.

8. The switching module of claim 1, wherein the edge-type optical substrate comprises a V-shaped reflecting structure disposed on a bottom of the edge-type optical substrate, the V-shaped reflecting structure guides the beam out of the edge-type optical substrate via the emitting surface according to the predetermined angle.

9. The switching module of claim 1, wherein the plurality of light units is disposed in a symmetric arrangement based on a middle point of the side of the edge-type optical substrate.

10. A backlight system comprising:
a plurality of switching module for adjusting visual angles, each switching module comprising:
an edge-type optical substrate having an emitting surface;
a light source disposed by a side of the edge-type optical substrate and on a bottom of the side of the edge-type optical substrate, the light source comprising a plurality of light units, each light unit emitting a beam to the edge-type optical substrate according to a predetermined angle;
an optical modulating component disposed between the light source and the edge-type optical substrate, the optical modulating component modulating divergence of the beam emitted from each light unit, so that the beam is guided out of the edge-type optical substrate via the emitting surface according to the predetermined angle; and
an optical coupling component disposed on the other side of the edge-type optical substrate opposite to the light source, the beam emitted from the light source being guided into the edge-type optical substrate via the optical modulating component and the optical coupling component, the optical coupling component guides the beam emitted from the light source into the edge-type optical substrate via the other side of the edge-type optical substrate in a reverse turning method.

11. The backlight system of claim 10, wherein the light units of the light source are arranged as an arc, so that each light unit emits the beam according to the predetermined angle.

12. The backlight system of claim 10, wherein the switching module further comprises:
at least one optical controlling component disposed on the corresponding light unit for adjusting the beam emitted from the light unit toward the predetermined angle.

13. The backlight system of claim 10, wherein the optical modulating component is a condenser lens, or a light guide plate with an embedded condenser structure.

14. The backlight system of claim 10, wherein structure of the optical modulating component corresponds to a predetermined curve function for converging an emitting angle of the beam emitted from each light unit.

15. The backlight system of claim 14, wherein the curve function of the optical modulating component corresponds to an incident angle of each beam emitted from the light units.

16. The backlight system of claim 10, wherein the switching module further comprises:
a processor electrically connected to the light source, the processor actuating the light units respectively or simultaneously, so as to switch angle control of local dimming of the edge-type optical substrate.

17. The backlight system of claim 10, wherein the edge-type optical substrate comprises a V-shaped reflecting structure disposed on a bottom of the edge-type optical substrate, the V-shaped reflecting structure guides the beam out of the edge-type optical substrate via the emitting surface according to the predetermined angle.

18. The backlight system of claim 10, further comprising:
at least one reflection unit disposed around the adjacent switching modules for reflecting the beam leaked from each switching module back into the switching module.

19. The backlight system of claim 10, wherein the plurality of light units is disposed in a symmetric arrangement based on a middle point of the side of the edge-type optical substrate.

20. A backlight system comprising:
a plurality of switching module for adjusting visual angles, each switching module comprising:
an edge-type optical substrate having an emitting surface;
a light source disposed by a side of the edge-type optical substrate, the light source comprising a plurality of light units, each light unit emitting a beam to the edge-type optical substrate according to a predetermined angle;
an optical modulating component disposed between the light source and the edge-type optical substrate, the optical modulating component modulating divergence of the beam emitted from each light unit, so that the beam is guided out of the edge-type optical substrate via the emitting surface according to the predetermined angle; and at least one optical controlling component disposed on the corresponding light unit for adjusting the beam emitted from the light unit toward the predetermined angle.

21. The backlight system of claim 20, wherein the light units of the light source are arranged as an arc, so that each light unit emits the beam according to the predetermined angle.

22. The backlight system of claim 20, wherein the optical modulating component is a condenser lens, or a light guide plate with an embedded condenser structure.

23. The backlight system of claim 20, wherein structure of the optical modulating component corresponds to a predetermined curve function for converging an emitting angle of the beam emitted from each light unit.

\* \* \* \* \*